United States Patent
White

(10) Patent No.: US 11,036,731 B2
(45) Date of Patent: *Jun. 15, 2021

(54) SYSTEMS, METHODS AND TECHNIQUES FOR POLYMORPHIC QUERIES

(71) Applicant: salesforce.com, inc., San Francisco, CA (US)

(72) Inventor: Seth John White, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/701,007

(22) Filed: Dec. 2, 2019

(65) Prior Publication Data

US 2020/0278965 A1 Sep. 3, 2020

Related U.S. Application Data

(63) Continuation of application No. 16/030,628, filed on Jul. 9, 2018, now Pat. No. 10,496,641, which is a continuation of application No. 15/225,750, filed on Aug. 1, 2016, now Pat. No. 10,019,479, which is a continuation of application No. 14/014,010, filed on Aug. 29, 2013, now Pat. No. 9,442,974.

(60) Provisional application No. 61/697,045, filed on Sep. 5, 2012.

(51) Int. Cl.
| | |
|---|---|
| *G06F 16/24* | (2019.01) |
| *G06F 16/2453* | (2019.01) |
| *G06F 16/248* | (2019.01) |
| *G06F 16/25* | (2019.01) |
| *G06F 16/242* | (2019.01) |
| *G06F 16/2455* | (2019.01) |

(52) U.S. Cl.
CPC ...... *G06F 16/24534* (2019.01); *G06F 16/248* (2019.01); *G06F 16/2428* (2019.01); *G06F 16/2433* (2019.01); *G06F 16/2448* (2019.01); *G06F 16/2455* (2019.01); *G06F 16/252* (2019.01)

(58) Field of Classification Search
CPC .................................................. G06F 16/2433
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

Corrected Notice of Allowability for U.S. Appl. No. 14/014,010 dated Jun. 16, 2016 9 pages.

(Continued)

*Primary Examiner* — Baoquoc N To
(74) *Attorney, Agent, or Firm* — Jaffery Watson Mendonsa & Hamilton LLP

(57) ABSTRACT

Techniques for providing polymorphic query requests. A request is received that has at least a database query. The database query comprises at least an expression using a polymorphic relationship. The request is processed utilizing the polymorphic relationship. A user-readable result is provided for the query where the result is defined by at least the polymorphic relationship.

18 Claims, 4 Drawing Sheets

(56) References Cited

U.S. PATENT DOCUMENTS

| | | | |
|---|---|---|---|
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,292,810 B1 * | 9/2001 | Richards | G06F 40/18 715/201 |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,246,114 B2 | 7/2007 | Bolognese et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 7,836,066 B2 | 11/2010 | Chang et al. | |
| 8,938,472 B2 | 1/2015 | Annapragada et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0289125 A1 | 12/2005 | Liu et al. | |
| 2007/0136262 A1 | 6/2007 | Dettinger et al. | |
| 2008/0092109 A1 | 4/2008 | Kinnucan et al. | |
| 2009/0177744 A1 | 7/2009 | Marlow et al. | |
| 2009/0248649 A1 | 10/2009 | Meek et al. | |
| 2011/0264668 A1 | 10/2011 | Hacker et al. | |
| 2011/0264704 A1 | 10/2011 | Mehra | |
| 2011/0265066 A1 | 10/2011 | Fee et al. | |
| 2011/0321150 A1 | 12/2011 | Gluck | |
| 2012/0151479 A1 | 6/2012 | Kothari | |
| 2012/0323941 A1 | 12/2012 | Chkodrov et al. | |
| 2013/0054648 A1 | 2/2013 | Mehta et al. | |
| 2014/0108399 A1 | 4/2014 | White | |

OTHER PUBLICATIONS

Corrected Notice of Allowance for U.S. Appl. No. 15/225,750 dated Apr. 5, 2018, 4 pages.

Final Office Action for U.S. Appl. No. 14/014,010 dated Dec. 21, 2015, 12 pages.

Non-Final Office Action for U.S. Appl. No. 14/014,010 dated Jun. 19, 2015, 14 pages.

Non-Final Office Action for U.S. Appl. No. 15/225,750 dated Aug. 11, 2017, 10 pages.

Non-Final Office Action for U.S. Appl. No. 16/030,628 dated May 16, 2019, 10 pages.

Notice of Allowance for U.S. Appl. No. 14/014,010 dated Jun. 8, 2016, 13 pages.

Notice of Allowance for U.S. Appl. No. 15/225,750 dated Mar. 14, 2018, 7 pages.

(56) References Cited

OTHER PUBLICATIONS

Notice of Allowance for U.S. Appl. No. 16/030,628 dated Sep. 9, 2019, 7 pages.

* cited by examiner

SYSTEMS, METHODS AND TECHNIQUES FOR POLYMORPHIC QUERIES

PRIORITY AND RELATED APPLICATION DATA

This United States continuation patent application is related to, and claims priority to U.S. patent application Ser. No. 16/030,628, filed on Jul. 9, 2018, entitled "SYSTEMS, METHODS AND TECHNIQUES FOR POLYMORPHIC QUERIES", now U.S. Pat. No. 10,496,641, with an issue date of Dec. 3, 2019, which is a continuation of U.S. patent application Ser. No. 15/225,750, filed on Aug. 1, 2016, entitled "SYSTEMS, METHODS AND TECHNIQUES FOR POLYMORPHIC QUERIES", now U.S. Pat. No. 10,019,479, issued Jul. 10, 2018, which is a continuation of U.S. patent application Ser. No. 14/014,010, filed on Aug. 29, 2013, entitled "SYSTEMS, METHODS AND TECHNIQUES FOR POLYMORPHIC QUERIES", now U.S. Pat. No. 9,442,974, issued Sep. 13, 2016, and is further related to, and claims priority to U.S. Provisional Patent Application No. 61/697,045, filed on Sep. 5, 2012, entitled "SYSTEM AND METHOD FOR OPTIMIZING THE RESULT OF A DATABASE OPERATION," which are all incorporated herein by reference in their entirety for all purposes.

TECHNICAL FIELD

Embodiments relate to database operations. More specifically, embodiments relate to techniques to provide a more useful and efficient results from one or more database operations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

With ever-growing organizations using huge databases, it is challenging to handle very large query requests require complex data process. Moreover, these organizations are seeking efficient ways of ensuring that unusually large query requests do not tie up the system and interrupt smooth execution of other queries.

Traditional query languages with large queries do not currently have a mechanism to apply polymorphism to very large queries and make the code more efficient and database processing faster and effective.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
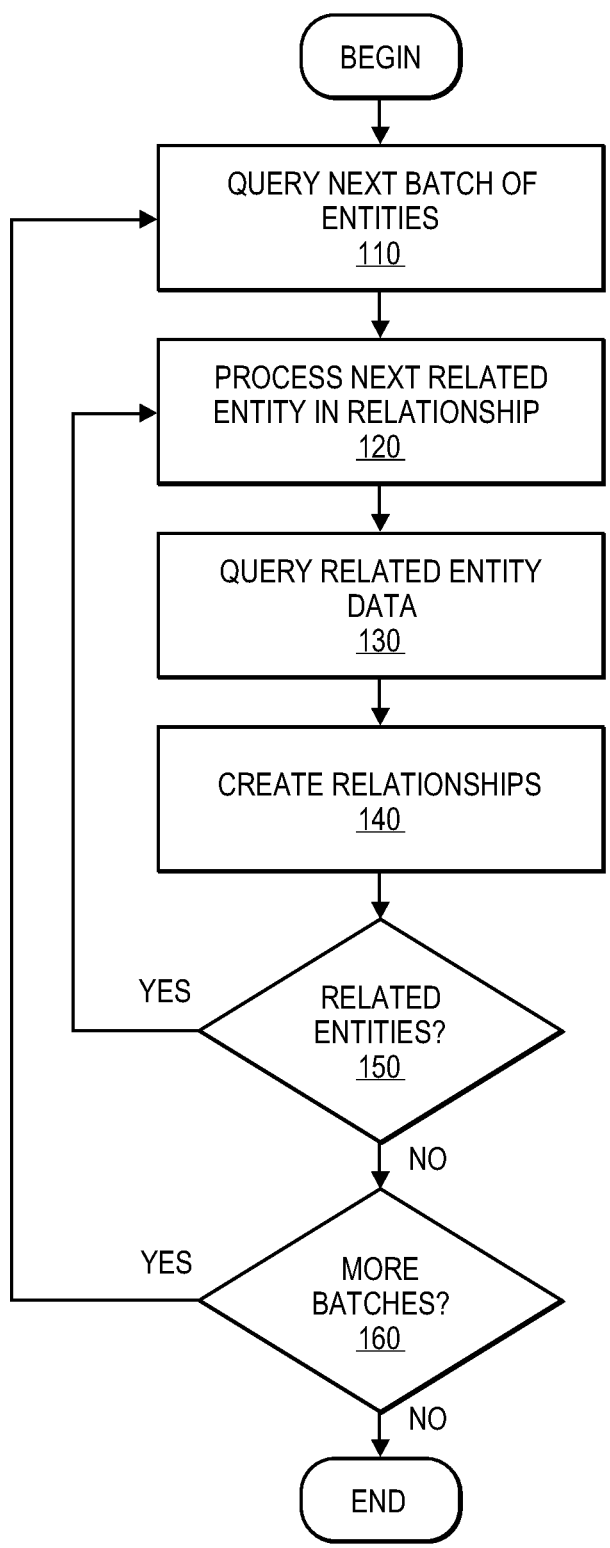
FIG. 1 is a flow diagram of one embodiment of a technique for using batch processing techniques to handle polymorphic relationships.

In the following description, numerous specific details are set forth. However, embodiments of the invention may be practiced without these specific details. In other instances, well-known circuits, structures and techniques have not been shown in detail in order not to obscure the understanding of this description.

Given the shortcomings set forth above, an opportunity arises to provide an efficient and effective system and method for handling very large queries by using polymorphism relationships that will provide users with great experience and increase their engagement.

The technology disclosed herein is related to enhancing large queries in, for example salesforce Object Query Language (SOQL) with support for selection of data using polymorphic relationships by adding, in one embodiment, a TYPEOF expressions added to the SOQL SELECT clause. In one embodiment, TYPEOF expressions can function as a case expression that can allow the user to specify the fields of a related parent object that are to be selected based on the type of the parent object.

In another implementation, the technology disclosed herein involves selecting different fields from a target of a polymorphic reference based on the target type. For example, while using a user-interface (abbreviated UI) when a user chooses the type as account for the 'what' tab, the system can automatically select relevant information such as the name, website or billing city associated with the account. In case if the user chooses the type as opportunity for the 'what' tab, the system can select the critical information related to that opportunity including its name, account name, and the amount. This technology can be used to reduce latency, especially in mobile environments by instrumenting a single very large query such as salesforce object query language (abbreviated SOQL).

In one implementation, the technology disclosed herein includes a special form of a so-called CASE expression that can be added to an SOQL SELECT clause. This implementation allows query authors to select a particular set of fields based on the runtime type of a polymorphic reference. The CASE expression can begin with the keyword TYPEOF and can conform to the BNF-style grammar:

```
<typeof expression> ::= TYPEOF<typeof operand><when clause>+<else clause>?END
<when clause> ::= WHEN<type name>THEN<field list>
<else clause> ::= ELSE<field list>
<typeof operand> ::= <path expression>
<path expression> ::= <identifier>('.'identifier)*
<type name> ::= identifier
<field list> ::= <path expression>(','<path expression>)*
```

In one embodiment, the SELECT clause can be extended. The following is one example of use of the extended SELECT clause.

```
<select clause> ::= SELECT<select list>
<select list> ::= <select list entry>(','<select listentry>)*
<select list entry> ::= <select field>|<nested query>|<typeof expression>
```

The TYPEOF expression includes <typeof operand> field that can denote a polymorphic relationship field. The <typeof operand> field can be evaluated at runtime and the type of the related entity can be compared against the type name listed in each WHEN clause. The type name that matches determine the list of fields that can be populated in the related parent entity. The fields in the matching WHEN clause's <field list> can be populated and a list containing the values can be returned as the value of the TYPEOF expression.

The elements in the returned list can be concatenated to the SELECT clause's <select list> and mapped to an object result using the usual conventions for mapping entries in the select list to object results. The TYPEOF expressions can be used in the SELECT clause of an object query. An optional <else clause> can be used to specify a list of fields that are returned when there is no matching <when clause>. The <field list> used for the <else clause> may only contain path expressions that are valid for the name entity. If no <else clause> is specified and there is no matching <when clause>, the reference to the parent entity can be set to null. The <typeof operand> argument can provide implicit context for the path expressions in each WHEN clause's <field list> and thus, <typeof operand> can be implicitly appended to each path name to determine the field that is selected as illustrated by the following example.

```
SELECT id, description,
    TYPEOF what
        WHEN Account THEN name, phone, website, billingCity
        WHEN Opportunity THEN name, account.name, amount, stageName
        WHEN Contact THEN name, account.name, title, phone website_c
        ELSE name, phone, email
    END
FROM Event
```

The example above includes a query that selects the id, description, and related 'what' parent entity for all events. For example, if the 'what' tab references an account, then the name, phone, website, and billing city fields of the referenced account can be populated. If "what" references an opportunity, then the name, account.name, amount, and stage name fields of the referenced opportunity can be populated.

In one embodiment, if 'what' does not reference either an account, opportunity or contact then the name, phone, and e-mail fields of the name entity can be selected. Each type name in the WHEN section can be unique and include a valid type for the polymorphic reference field. Otherwise, an error can be generated. The custom fields may appear in the WHEN clause and path expressions as illustrated below.

```
SELECT id, description,
    TYPEOF what
        WHEN Account THEN what.name, what.phone, what.website, what.billingCity
        WHEN Opportunity THEN what.name, what.account.name, what.amount, what.stageName
        WHEN Contact THEN what.name, what.account.name, what.title, what.phone, what.website_c
        ELSE what.name, what.phone, what.email
    END
FROM Event
```

It may be noticed that the field lists may become repetitive. In one embodiment, the implicit context rule can be used to eliminate this repetitiveness. Since, implicit context may not be optional, the query may be invalid. This example is included only to illustrate how implicit context can work in SOQL TYPEOF expressions.

In another implementation, the technology disclosed herein includes filtering and selection based on the polymorphic type. The query in immediately above can select events that reference an account, opportunity, or contact via 'what'. The fields that are selected for each case can be determined by the TYPEOF expression, as illustrated above. Other types besides account, opportunity and contact may appear in the WHEN section.

There can exist inconsistency between the WHERE and SELECT clauses because in the WHERE clause type names are strings, while in the SELECT clause they are proper type names. In yet another implementation, the technology disclosed herein introduces a new TYPE( ) function that may remove this inconsistency.

In one embodiment, the new TYPEOF expression can be used in nested child sub-queries for the new 'many who' feature to work well with polymorphic relationships. In another implementation, the TYPEOF expression can be used for retrieving data using a separate query. The additional queries can count towards governor limits just like regular foreign key relationship queries. In another implementation, multiple TYPEOF expressions may appear in the same SELECT clause.

In another implementation, the technology disclosed herein includes filter expressions in the WHERE clause which can be consistent with TYPEOF expressions in the SELECT clause. This implementation allows adding a new TYPE( ) function. TYPE( ) can return the type, such as account or contact, of its path expression argument. The path expression can denote a polymorphic reference field, such as 'event.what', 'case.owner' and etc.

In another implementation, the TYPE( ) function can be used to create 'type restriction expressions' which restrict or constrain the set of allowed types of a polymorphic reference field. Type restriction expressions may appear in the WHERE clause. The example below illustrates the selection of all events whose 'what' field references an account.

```
SELECT id, description
FROM Event
WHERE TYPE(what)=Account
```

More specifically, the query above can select the id and description fields of all events whose what field reference an account. The type restriction expression in the where clause can also be used to match the events that reference to an account via their 'what' field. The example below is an alternative formulation of the query immediately above.

```
SELECT id, description
FROM Event e
WHERE TYPE(e.what)=Account
```

The range variable e of the query above can be declared explicitly and used in the type restriction expression as illustrated below. Here, the range variable, w, an alias for the 'event.what' field can be declared explicitly in the FROM clause and used in the WHERE clause.

```
SELECT id, description
FROM Event e, e.what w
WHERE TYPE(w)=Account
```

In another implementation, a user can create a filter based on a set of types. The following example depicts a query that selects only events with 'what' field referencing to an account, contact or opportunity. Each element of the list can be unique and a valid type for 'event.what'.

```
SELECT id, description
```

FROM Event
WHERE TYPE(what) IN (Account, Opportunity, Contact)

The following example shows a query not referencing to an account in its 'what' field.

SELECT id, description
FROM Event
WHERE TYPE(what)!=Account

The following example illustrates a query with restriction expressions that are combined using standard logical operators. The following query can select events with 'what' and 'who' fields both referencing an account.

SELECT id, description
FROM Event
WHERE TYPE(what)=Account AND TYPE (who)=Account The following example query illustrates the use of disjunction to combine type restriction expressions. It can select events with 'what' or 'who' fields both referencing an account.

SELECT id, description
FROM Event
WHERE TYPE(what)=Account OR TYPE (who)=Account In one embodiment, type restriction expressions can be combined with regular filter expressions in the WHERE clause. The following example query can select events with 'what' field referencing an account or activity date filed referencing to today.

SELECT id, description
FROM Event
WHERE          TYPE(what)=Account          OR
    activityDate=TODAY In another implementation, the type of a polymorphic reference can also be selected. For example, the following query can select the id, description, and the type of the 'what' field for all events.

SELECT description, TYPE(what)
FROM Event

The following table depicts example results of the performance of above described queries. It may be noticed that the result of the TYPE( ) function can be implicitly converted to string when it appears in the SELECT clause.

| 'Coffee with Bob' | 'Account' |
| 'Morning Meeting' | 'Opportunity' |
| '1-on-1 with Mike' | 'Contact' |

In yet another implementation, the technology disclosed herein allows aggregation of expressions based on types. For example, the following example query can count the number of events that reference account, opportunity, etc. via "what" and producing results depicted following the example query.

SELECT TYPE(what), COUNT(*)
FROM Event
GROUP BY TYPE(what)

| 'Account' | 10000 |
| 'Opportunity' | 100000 |
| 'Contact' | 50 |

In yet another implementation, the technology disclosed herein allows general TYPE expressions in the WHERE clause. For example, the following example query can select the events with the same type of 'what' and 'who' fields.

SELECT id
FROM Event
WHERE TYPE(what)=TYPE(who)

The example of illustrating the use of technology disclosed herein in database environment such as SOQL should not be taken as limiting or preferred. This example sufficiently illustrates the technology disclosed without being overly complicated. It is not intended to illustrate all of the technologies disclosed. For instance, it does not illustrate use of query paging and optimization in SOAP, REST, queryMore, UnQL, YQL, QUEL and other query languages and APIs.

Accordingly, these implementations can save valuable computation time and are suited for use with: devices with a small form factor, limited interactive capability, limited display size, limited memory or storage capacity, limited processing power and short battery life; and/or with networks that have/are not consistently available, slow data transfer rates, erratic data transfer services, and no consistent standards; with data having massive quantity and that is not organized for mobile users; with users that have short attention spans, no patience, are on the move, and are routinely in awkward or limited usage situations; and with managers who have security concerns and where applications, devices, and users require a new management layer.

In one embodiment, to provide the functionality described herein, queries may be handled in batches. In one embodiment, a high-level query (e.g., SOQL query) can be broken down into multiple queries to a relational database. This can, for example, reduce the total number of queries performed. In one embodiment, a limited number of events can be selected and relational database queries for the limited number of events can be performed and a subsequent batch of queries can be performed for a different set of events. The batching techniques described herein are particularly useful with the TYPEOF clause.

FIG. 1 is a flow diagram of one embodiment of a technique for using batch processing techniques to handle polymorphic relationships. In one embodiment, the queries may be directed to a multitenant database (described in greater detail below). In alternate embodiments, the queries may be directed to non-multitenant databases.

A query is performed for a batch of entities, 110. In one embodiment, for each batch, a single query (e.g., SQL query) can be used to retrieve all of the related entities of each type. This is more efficient than querying for each related entity individually.

When a query is completed (110), the next related entity in the relationship is processed, 120, to generate query-related entity data, 130. In one embodiment, for each related entity, a relationship is created between the original and corresponding related entity, 140.

If there are more related entities in the current relationship, 150, then the next related entity in the relationship is processed, 120. If there are no more related entities in the current relationship, 150, then the system determines if there are more batches to process, 160. If there are more batches to process, 160, then the next batch query is processed, 110. If there are no more batches to process, 160, then the query handling is complete.

Figure 2:
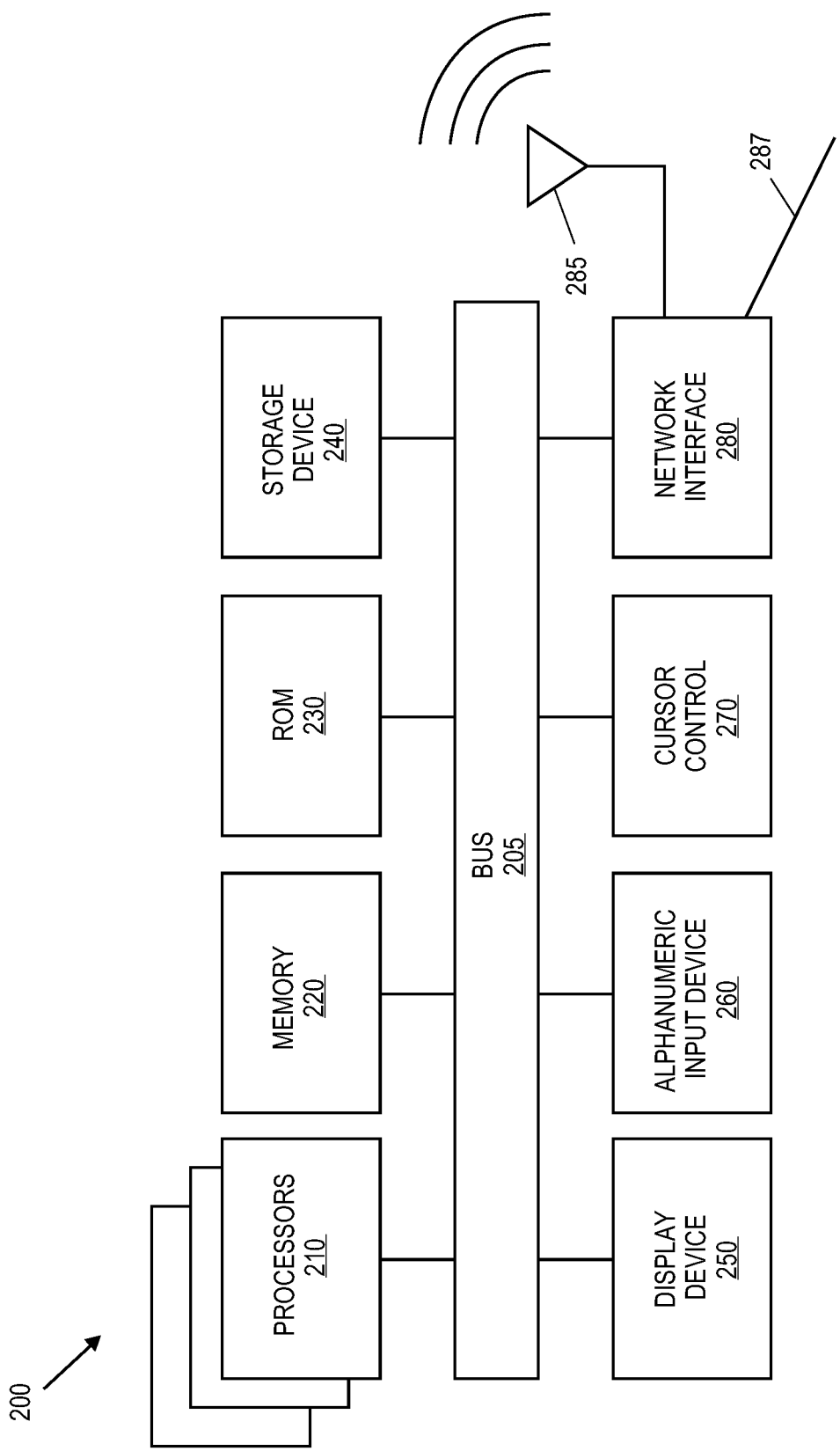
FIG. 2 is a block diagram of one embodiment of an electronic system.

FIG. 2 is a block diagram of one embodiment of an electronic system. The electronic system of FIG. 2 is an example system that can handle queries with polymorphic relationships as described herein. The electronic system illustrated in FIG. 2 is intended to represent a range of electronic systems (either wired or wireless) including, for example, desktop computer systems, laptop computer systems, cellular telephones, personal digital assistants (PDAs) including cellular-enabled PDAs, set top boxes, tablets, etc. Alternative electronic systems may include more, fewer and/or different components.

Electronic system 200 includes bus 205 or other communication device to communicate information, and processor 210 coupled to bus 205 that may process information. While electronic system 200 is illustrated with a single processor, electronic system 200 may include multiple processors and/or co-processors. Electronic system 200 further may include random access memory (RAM) or other dynamic storage device 220 (referred to as main memory), coupled to bus 205 and may store information and instructions that may be executed by processor 210. Main memory 220 may also be used to store temporary variables or other intermediate information during execution of instructions by processor 210.

Electronic system 200 may also include read only memory (ROM) and/or other static storage device 230 coupled to bus 205 that may store static information and instructions for processor 210. Data storage device 240 may be coupled to bus 205 to store information and instructions. Data storage device 240 such as a magnetic disk or optical disc and corresponding drive may be coupled to electronic system 200.

Electronic system 200 may also be coupled via bus 205 to display device 250, such as a cathode ray tube (CRT) or liquid crystal display (LCD), to display information to a user. Alphanumeric input device 260, including alphanumeric and other keys, may be coupled to bus 205 to communicate information and command selections to processor 210. Another type of user input device is cursor control 270, such as a mouse, a trackball, or cursor direction keys to communicate direction information and command selections to processor 210 and to control cursor movement on display 250.

Electronic system 200 further may include network interface(s) 280 to provide access to a network, such as a local area network. Network interface(s) 280 may include, for example, a wireless network interface having antenna 285, which may represent one or more antenna(e). Network interface(s) 280 may also include, for example, a wired network interface to communicate with remote devices via network cable 287, which may be, for example, an Ethernet cable, a coaxial cable, a fiber optic cable, a serial cable, or a parallel cable.

In one embodiment, network interface(s) 280 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/ or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 280 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 3:
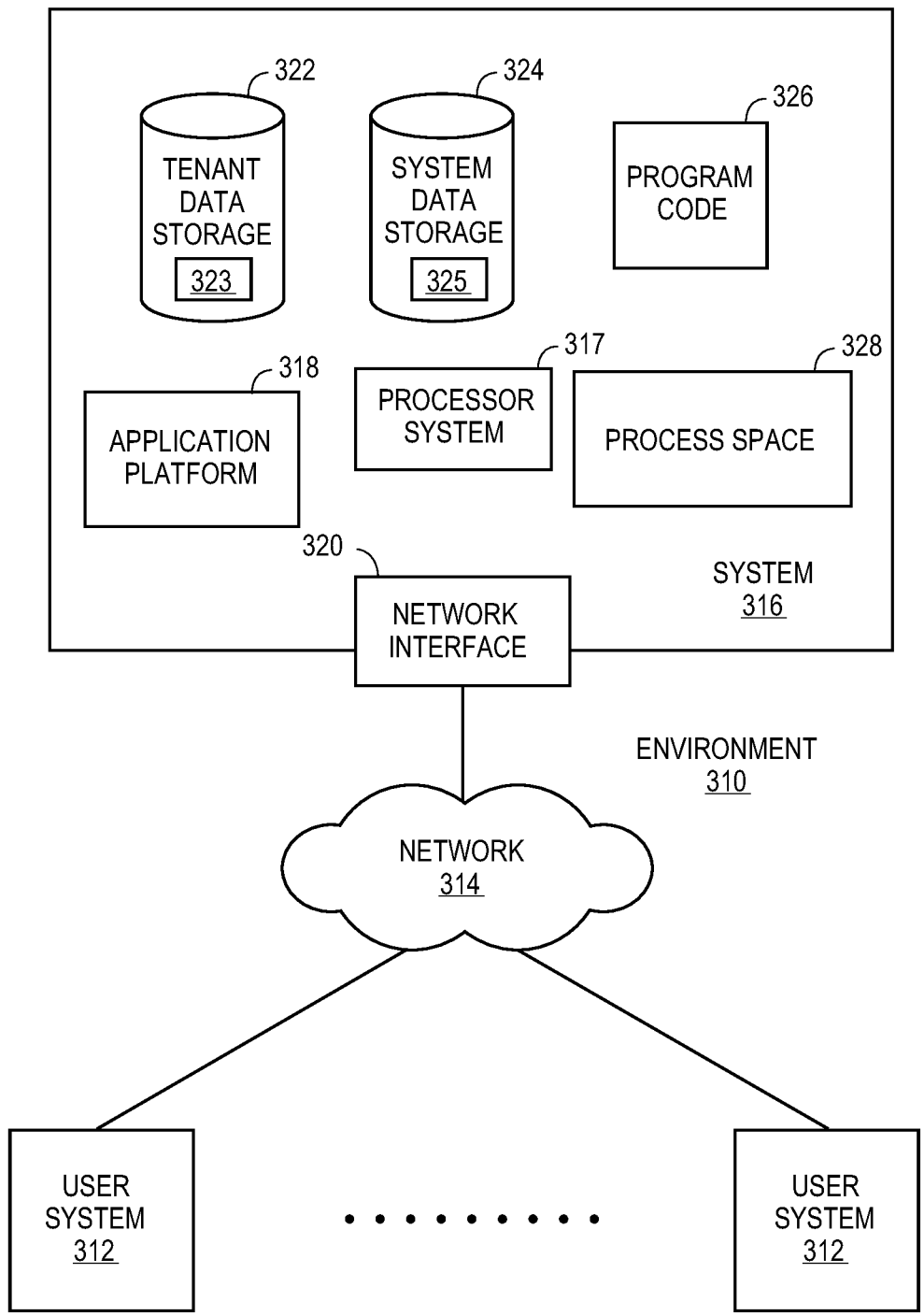
FIG. 3 illustrates a block diagram of an environment where an on-demand database service might be used.

FIG. 3 illustrates a block diagram of an environment 310 wherein an on-demand database service might be used. The query techniques and mechanisms described herein may be utilized in an on-demand, or multitenant, database environment. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein.

A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator.

In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314.

Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
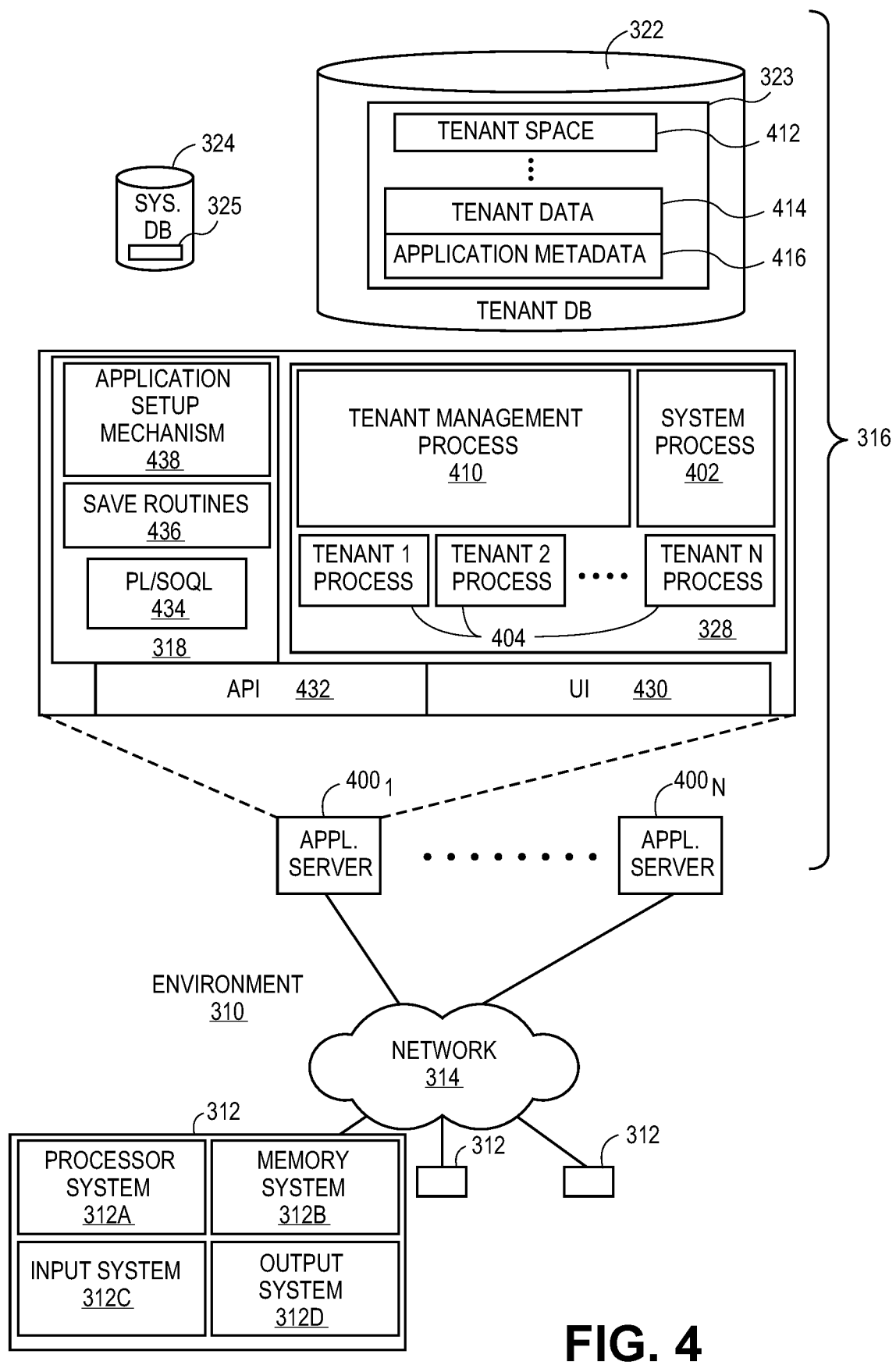
FIG. 4 is a block diagram of one embodiment of a multi-tenant environment.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$500_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks.

As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 30/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400.

In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for polymorphic selection of data from a database storing data on at least one memory device and managed by one or more hardware processors, the method comprising:

receiving, with the one or more processors, a request that has at least a database query comprising at least an expression using a polymorphic relationship and a database query language clause to narrow results;

adding, with the one or more processors, an expression to at least one database query language clause to allow specification of fields of a related parent object that are to be selected based on the polymorphic relationship;

processing the request utilizing the polymorphic relationship, with the one or more processors, by running the query against a portion of a set of data in the database; and transmitting, with the one or more processors, a result for the database query, where the result is defined by at least the polymorphic relationship, to a remote electronic device.

2. The method of claim 1 wherein the database query is for a multitenant database.

3. The method of claim 1 wherein the expression selects different fields form a target of a polymorphic reference based on target type.

4. The method of claim 3 wherein the query is processed as a plurality of batches.

5. The method of claim 1 wherein the remote electronic device comprises a mobile computing device.

6. The method of claim 1 wherein the polymorphic relationship is determined based on input received via a user interface.

7. A non-transitory computer-readable medium having instructions for polymorphic selection of data from a database storing data on at least one memory device and managed by one or more hardware processors that, when executed by one or more processors, cause the one or more processors to:
receive, with the one or more processors, a request that has at least a database query comprising at least an expression using a polymorphic relationship and a database query language clause to narrow results;
add, with the one or more processors, an expression to at least one database query language clause to allow specification of fields of a related parent object that are to be selected based on the polymorphic relationship;
process the request utilizing the polymorphic relationship, with the one or more processors, by running the query against a portion of a set of data in the database; and
transmit, with the one or more processors, a result for the database query, where the result is defined by at least the polymorphic relationship, to a remote electronic device.

8. The non-transitory computer-readable medium of claim 7 wherein the database query is for a multitenant database.

9. The non-transitory computer-readable medium of claim 7 wherein the expression selects different fields form a target of a polymorphic reference based on target type.

10. The non-transitory computer-readable medium of claim 7 wherein the query is processed as a plurality of batches.

11. The non-transitory computer-readable medium of claim 7 wherein the remote electronic device comprises a mobile computing device.

12. The non-transitory computer-readable medium of claim 7 wherein the polymorphic relationship is determined based on input received via a user interface.

13. A system comprising:
one or more user systems;
one or more server systems communicatively coupled with the one or more user systems, the server system to receive a request that has at least a database query comprising at least an expression using a polymorphic relationship and a database query language clause to narrow results, to add an expression to at least one database query language clause to allow specification of fields of a related parent object that are to be selected based on the polymorphic relationship, to process the request utilizing the polymorphic relationship by running the query against a portion of a set of data in the database, and to transmit a result for the database query, where the result is defined by at least the polymorphic relationship, to a remote electronic device.

14. The system of claim 13 wherein the database query is for a multitenant database.

15. The system of claim 13 wherein the expression selects different fields form a target of a polymorphic reference based on target type.

16. The system of claim 13 wherein the query is processed as a plurality of batches.

17. The system of claim 13 wherein the remote electronic device comprises a mobile computing device.

18. The system of claim 13 wherein the polymorphic relationship is determined based on input received via a user interface.

* * * * *